United States Patent [19]
Kumon

[11] Patent Number: 5,208,902
[45] Date of Patent: May 4, 1993

[54] RECORDING APPARATUS
[75] Inventor: Toshihiko Kumon, Toyokawa, Japan
[73] Assignee: Minolta Camera Kabushiki Kaisha, Osaka, Japan
[21] Appl. No.: 690,071
[22] Filed: Apr. 23, 1991

Related U.S. Application Data

[63] Continuation of Ser. No. 423,488, Oct. 12, 1989, abandoned, which is a continuation of Ser. No. 57,941, Jun. 3, 1987, abandoned.

[30] Foreign Application Priority Data

Jun. 13, 1986 [JP] Japan ................................ 61-136046

[51] Int. Cl.$^5$ ............................................ G06F 15/66
[52] U.S. Cl. ................................... 395/116; 395/115; 395/102; 355/311; 400/708.1
[58] Field of Search ................... 400/707.1, 708, 708.1; 364/518, 519, 521; 355/72, 311, 343; 395/162, 164, 165, 115, 116, 102

[56] References Cited
U.S. PATENT DOCUMENTS

| | | | |
|---|---|---|---|
| 4,095,879 | 6/1978 | Katayama et al. | 355/4 |
| 4,260,248 | 4/1981 | Murata et al. | 355/60 |
| 4,372,676 | 2/1983 | Miyata et al. | 355/14 C |
| 4,435,077 | 3/1984 | Suzuki et al. | 355/51 |
| 4,564,301 | 1/1986 | Ueno | 400/63 |
| 4,597,663 | 7/1986 | Yoshiura et al. | 355/14 R |
| 4,666,289 | 5/1987 | Kawano | 355/14 R |
| 4,669,863 | 6/1987 | Yoshiura et al. | 355/14 SH |
| 4,671,683 | 6/1987 | Ueno et al. | 400/61 |
| 4,672,465 | 6/1987 | Ono | 358/296 |
| 4,733,269 | 3/1988 | Kasahara et al. | 355/4 |
| 4,737,748 | 4/1988 | Ito | 355/14 R |
| 4,745,560 | 5/1988 | Decker et al. | 364/519 |
| 4,763,889 | 8/1988 | Dei et al. | 271/9 |
| 4,794,403 | 12/1988 | Sieber et al. | 346/33 R |
| 4,800,510 | 1/1989 | Vinberg et al. | 364/521 |

FOREIGN PATENT DOCUMENTS

| | | | |
|---|---|---|---|
| 3211843 | 10/1983 | Fed. Rep. of Germany | 400/708 |
| 3628528 | 3/1987 | Fed. Rep. of Germany | 400/708 |
| 0199976 | 9/1986 | Japan | 400/708 |

Primary Examiner—Phu K. Nguyen
Attorney, Agent, or Firm—Price, Gess & Ubell

[57] ABSTRACT

A recording apparatus for editing electrical image data output by a data processing system and for visually recording the image data on a recording medium. The recording apparatus is provided with magnet and lead switch pairs for detecting breadthwise size of the recording medium. The size of the recording medium supplied thereto and the size of the image area to be recorded on the recording medium are determined based upon the detected breadth. An image editing unit is provided within the recording apparatus for editing the electrical image data output from the data processing system in an area of memory corresponding to the size of the above determined image area, for outputting the edited data to a printing unit whereby the image data is visually recorded in the image area of the recording medium.

27 Claims, 15 Drawing Sheets

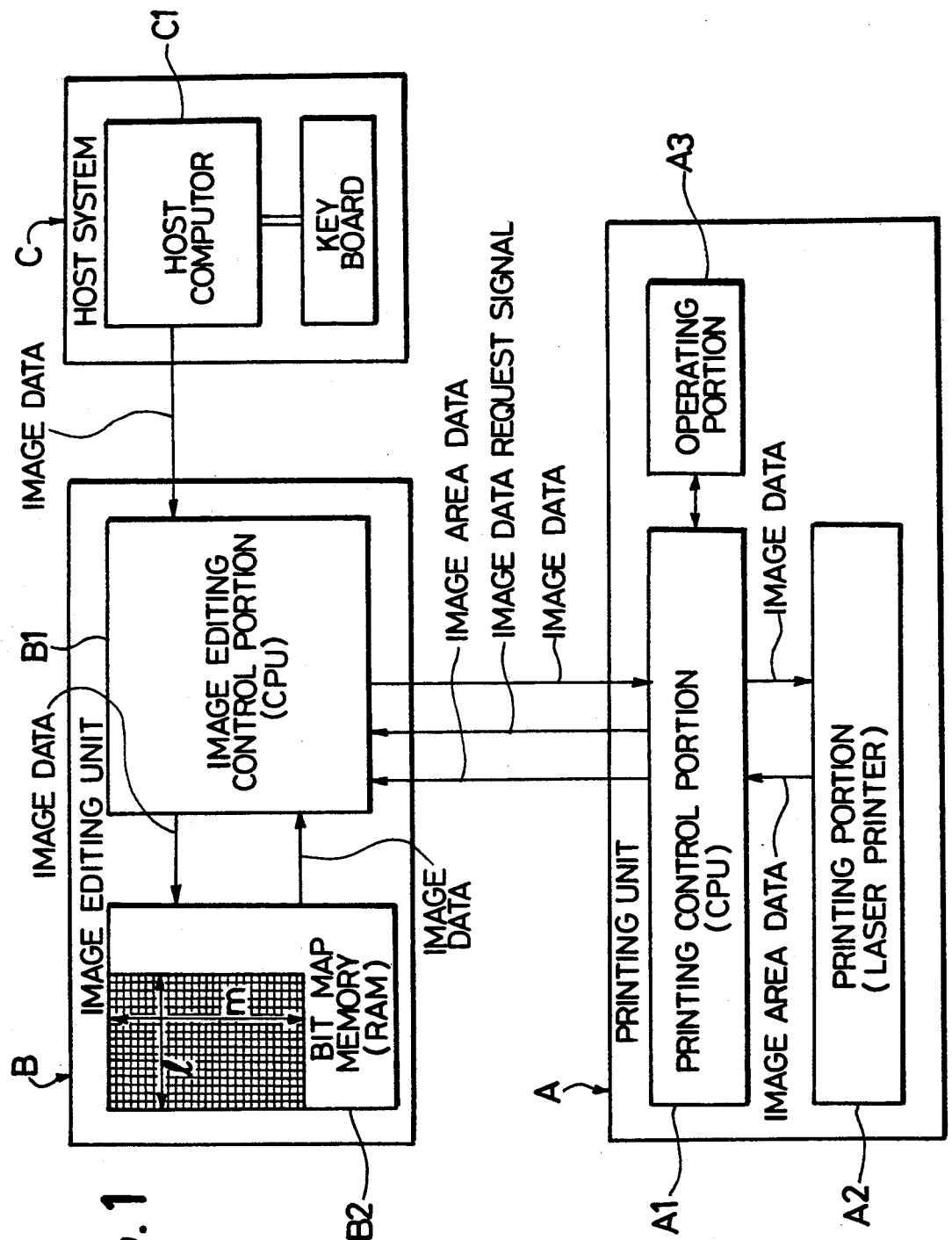
F I G. 1

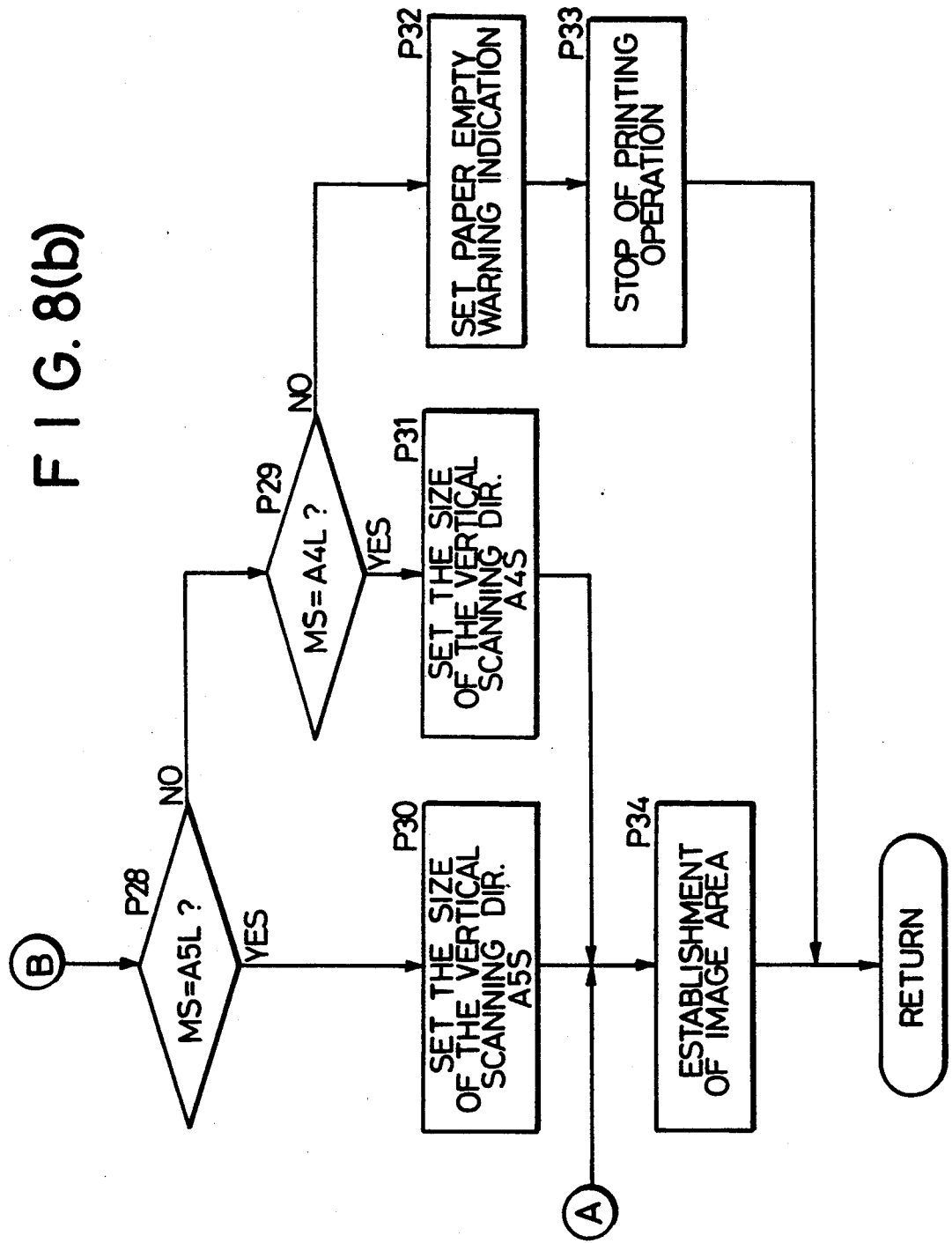

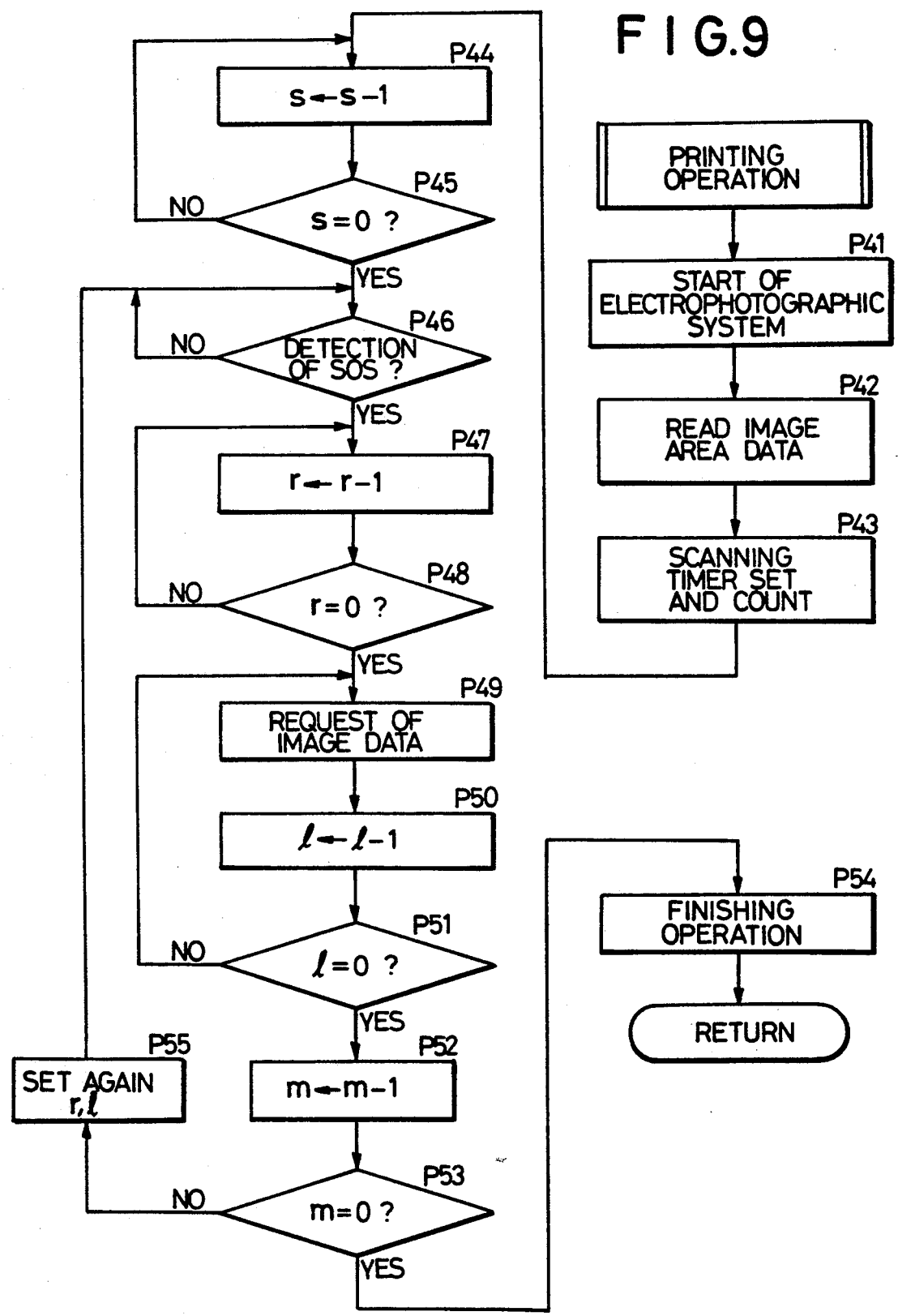

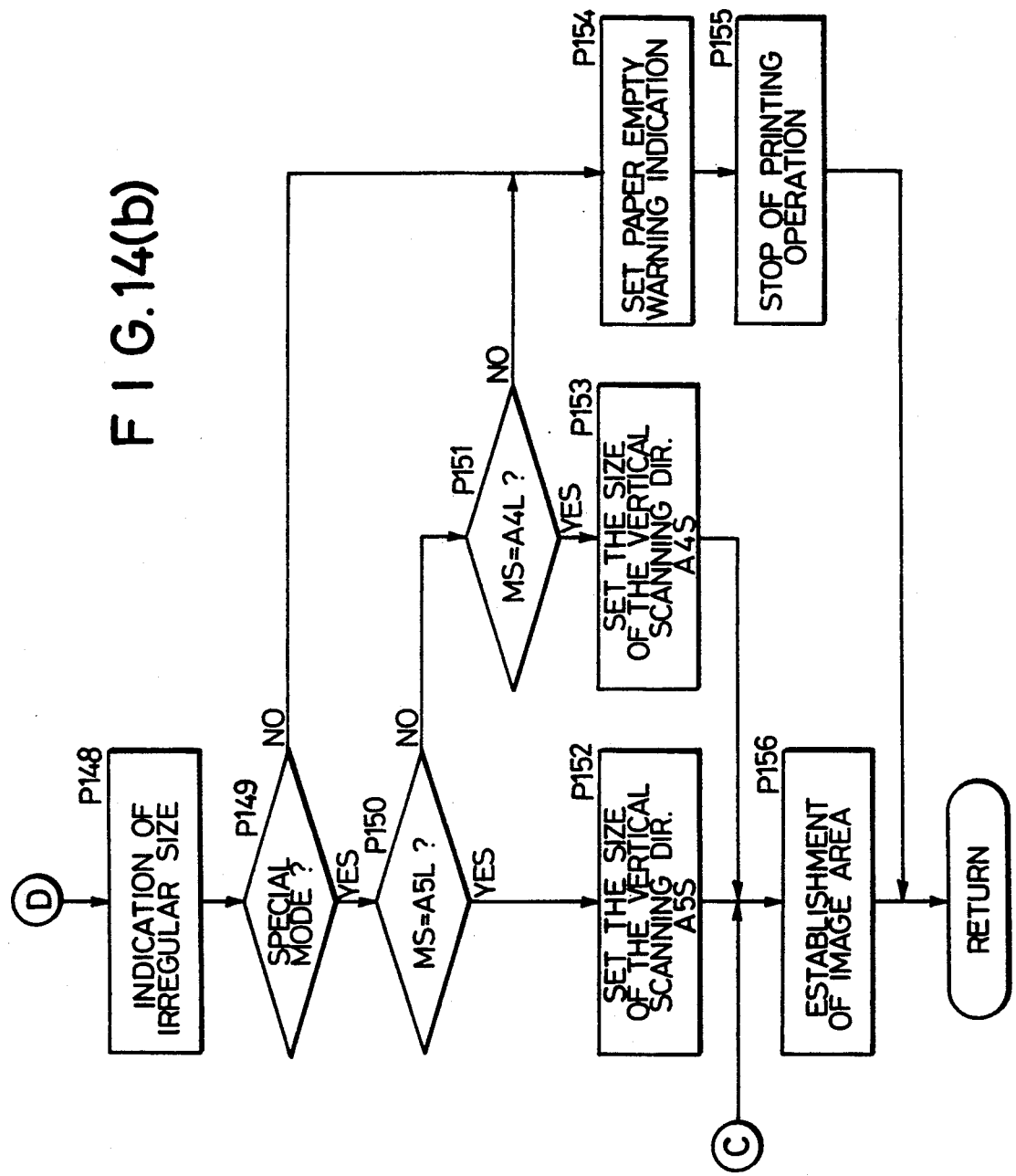

RECORDING APPARATUS

This is a continuation of application Ser. No. 07/423,488, filed on Oct. 12, 1989, now abandoned, which is a continuation of application Ser. No. 057,941, filed on Jun. 3, 1987, for a now abandoned.

BACKGROUND OF THE INVENTION

1. Field of the Invention

The present invention relates to a recording apparatus for editing image data output from a data processing system such as a computer and word processor and recording the data visually on a recording medium.

2. Description of the Prior Art

Recording apparatus for editing output data from a data processing system such as a computer and word processor and recording the data visually on a medium such as paper is provided with a paper supply means for automatically supplying standardized recording paper from a cassette, paper supply stacker, etc.

In order to edit the data output from the data processing system in conformity with the size of the paper used for the recording, such recording apparatus require the size of the paper as image area data. Therefore, conventional recording apparatus using such an automatic paper supply mechanism detect size of paper from the recording paper cassette or the like provided therein and determine the image area data from the detected size.

When inputting the size of paper used in the recording apparatus from a recording paper cassette, the longitudinal and transverse sizes of the paper used are read from a code portion provided on the recording paper cassette adapted for detecting the size by the use of magnets or the like, the same as in general electrophotographic copiers, and the size are used as image area data in the main (transverse direction) and vertical (longitudinal direction) scanning directions. Thus, the code portion outputting the longitudinal and transverse size of the recording paper is provided on the side of the paper supply cassette, but specifically in the case where a universal cassette is used which is enabled to handle plural kinds of paper of different sizes, longitudinal and transverse guides must be correctly adjusted to the paper size in order that correct paper sizes are output from the code portions. Therefore, extreme caution should have been exercised when such a universal cassette is used.

And, in the case where the recording paper is manually supplied to the recording apparatus, since detection is only possible of the breadth of the recording paper, such troublesome operation has been required in the conventional recording apparatus to have the size of the recording paper input in advance.

SUMMARY OF THE INVENTION

A principal object of the present invention is the provision of a recording apparatus capable of detecting the dimension of the recording medium supplied to its image forming means and determining the size of the image area to be formed on the recording medium based on the detected dimension for editing and recording the image data.

Another object of the present invention is the provision of a recording apparatus which is enabled to decide the size of the image area in the recording apparatus only from the breadthwise dimension of the recording medium supplied thereto.

These and other objects are achieved by the apparatus having the following characteristics.

The apparatus according to the present invention comprises image forming means for scanning a light beam modulated in accordance with the image data to form the image corresponding to the data to be recorded, supply means for supplying the recording medium to the image forming means, detection means for detecting the breadth of the recording medium to output a breadth signal, and means in response to the breadth signal for determining the image area to be formed on the recording medium.

BRIEF DESCRIPTION OF THE DRAWINGS

FIG. 1 is a block diagram showing a data processing system for recording data on a recording medium;

FIG. 8 which involves FIGS. 8a and 8b is a flow chart of a first embodiment of an image area establishment routine;

FIG. 9 is a flow chart of a printing operation routine;

FIG. 14 which includes FIGS. 14a and 14b is a flow chart of a second embodiment of an image area establishment routine.

DESCRIPTION OF THE PREFERRED EMBODIMENTS

Figure 2:
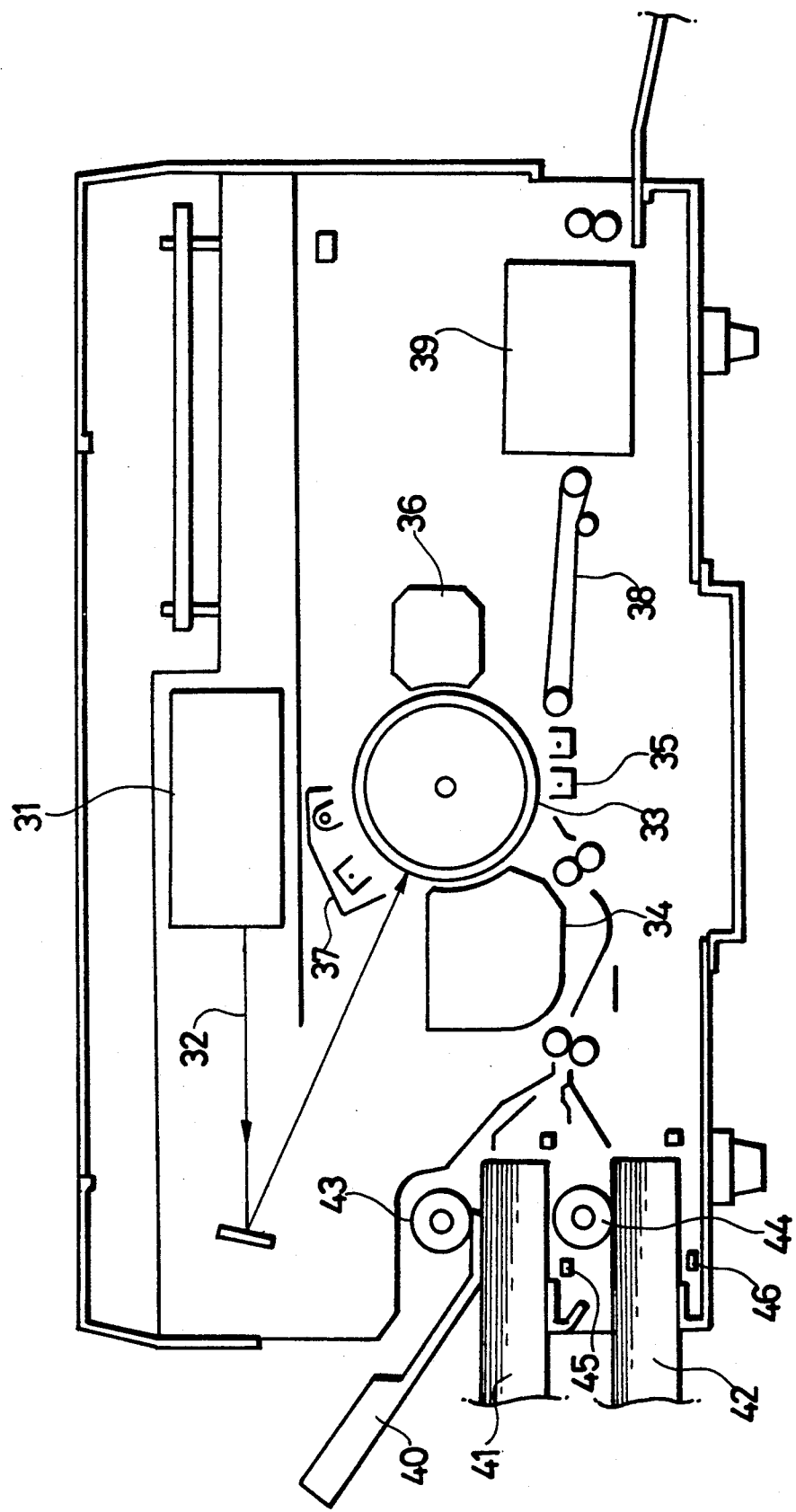
FIG. 2 is a sectional view showing a general arrangement of a laser beam printer in which the present invention is embodied.

FIG. 1 is a block diagram showing a data processing system for recording data on a recording medium.

Referring to the figure, A denotes a printing unit which comprises a printing control portion A1, a printing portion A2 which is a laser printer of an electrophotographic system, and an operating portion A3.

Reference character B denotes an image editing unit which comprises an image editing control portion B1 and a bit map memory B2 made up of random access memory (RAM).

Reference character C denotes a host system being a host computer C1, word processor, or the like.

The printing control portion A1 is a processor having functions of outputting the paper size detected by later discussed paper size detection portions 45, 46 of the printing portion A2 to the image editing control portion B1 as image area data and of receiving image data to output to the printing portion after edited on the bit map memory B2.

The printing portion A2 is a laser beam printer known in the art, in which a laser beam emitted from a laser optical portion is controlled by a later described image data so that an electrostatic latent image of the image data is formed on a photosensitive drum, and the said latent image then undergoes the processes of developing with a toner, transferring to recording paper, and fixing on the paper, and thereby a print is produced. Excepting the method for forming the electrostatic latent image on the photosensitive member, the described printer is not essentially different from copiers of the electrophotographic system.

FIG. 2 is a sectional view showing general arrangement of the principal portion of the laser beam printer, in which 31 denotes a laser optical portion, 32 denotes a laser beam optical path, 33 denotes a photosensitive drum, 34 denotes a developing device, 35 denotes a transferring device, 36 denotes a cleaner, 37 denotes a unit of a charger and a charge eliminator, 38 denotes a paper transporting portion, and 39 denotes a fixing device.

And, 40 denotes a manual paper supply tray, 41 denotes upper paper supply cassette, 42 denotes lower paper supply cassette, 43 and 44 denote paper supply rollers, 45 and 46 denote detection portions for detecting size of the recording paper received in the paper supply cassette.

Figure 3:
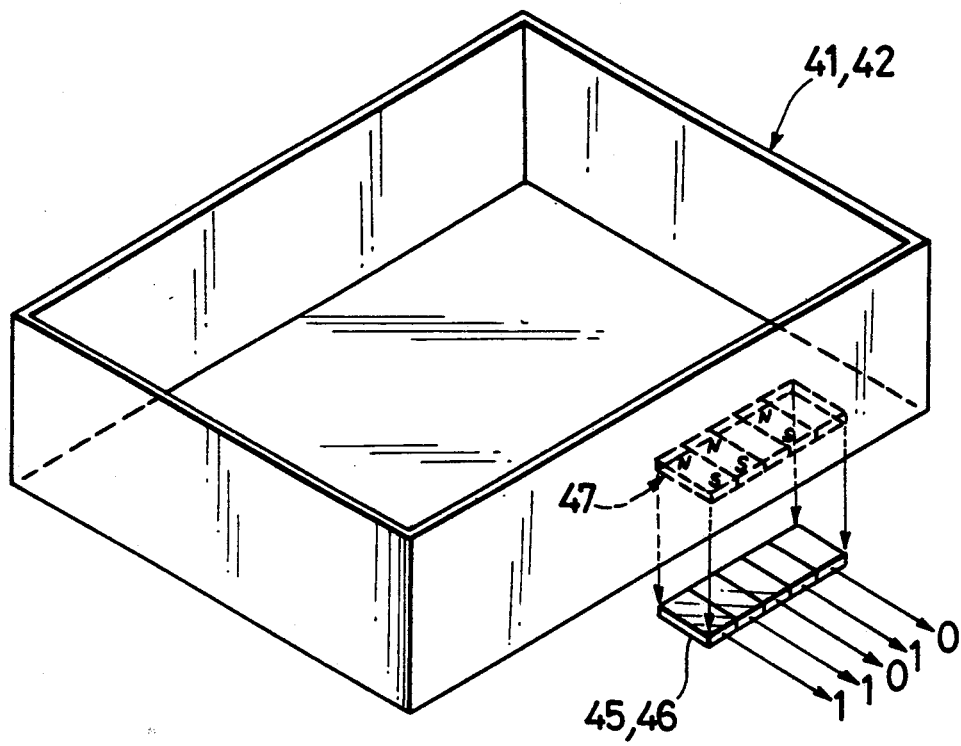
FIG. 3 is a drawing showing structure of a magnet code portion for indicating size of recording paper on a paper supply cassette and a code detection portion thereof.

On the underside of the paper supply cassette 41, 42, there are provided five magnet code portions 47 indicating the paper size as shown in FIG. 3, and in a paper supply inlet of the printing portion A2 where the paper supply cassette is mounted, there are provided the paper size detection portions 45, 46, for example, of lead switches at the location corresponding to the magnet code portions 47, whereby the size of the recording paper is indicated by 5-bits code provided by a combination of up to five sets of the magnets attached to the magnet code portions 47 on the underside of the paper supply cassette.

Figure 4:
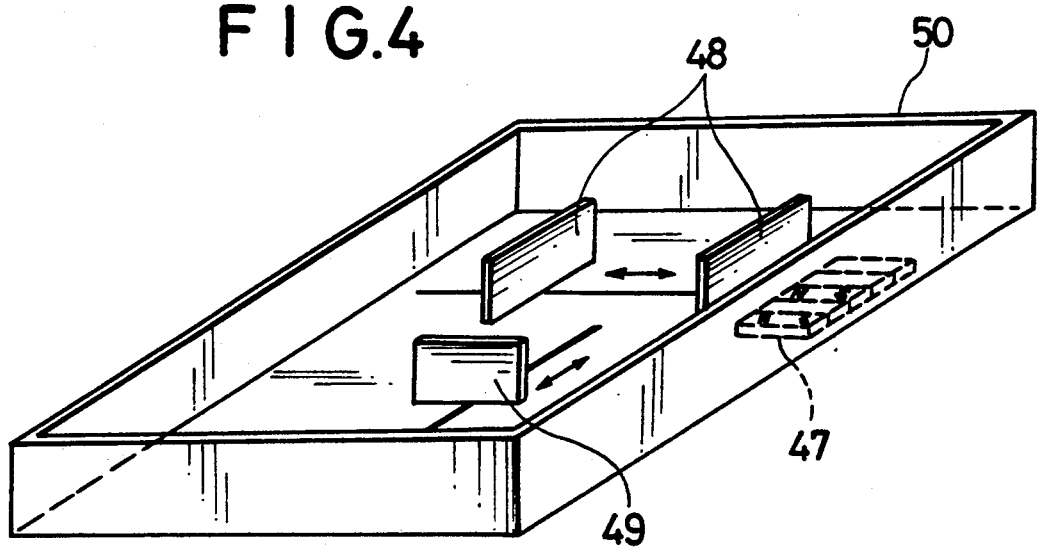
FIG. 4 is a diagram showing structure of a universal cassette.

A universal cassette 50 capable of handling plural kinds of recording papers of different sizes looks externally as shown in FIG. 4 and is used having a guide 48 for the breadthwise direction of the paper (the main scanning direction of the printer) and a guide 49 for the lengthwise direction of the paper (the vertical scanning direction of the printer) independently adjusted to the paper used. The cassette is provided with magnet code portions 47 (only one is shown) being shiftable in accordance with the movement of the guides 48, 49 respectively, and the code indicating the breadthwise and lengthwise sizes of the paper set therein is established by adjusting the guides 48 and 49 to the recording paper.

More concretely, each of the selected positions of the magnets 47 according to the movement of the guide 48, 49 is detected by a plurality of lead switches. Therefore, by arranging such that the signals detected by a plurality of lead switches are correlated with the positions of the guides in correspondence with the breadthwise and lengthwise sizes of the paper, paper size is known from the positions of the guides.

Figure 5:
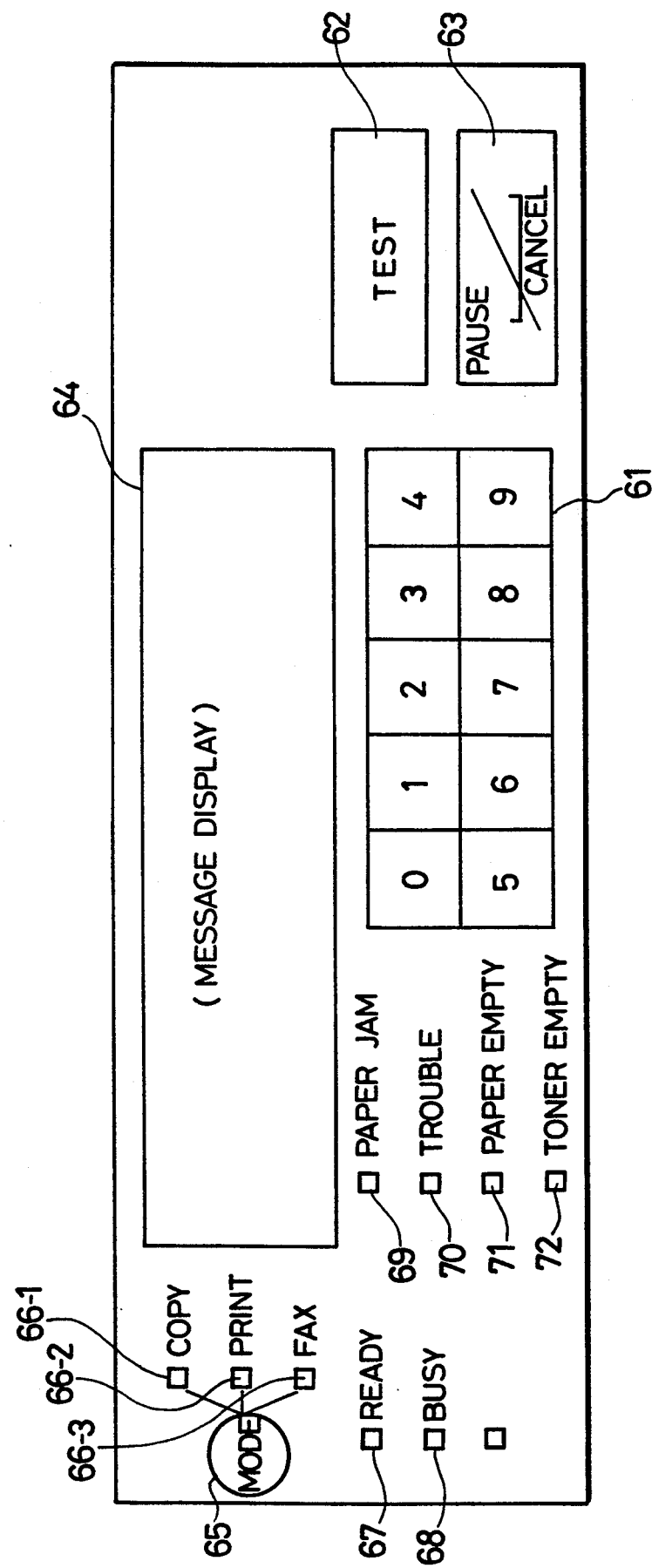
FIG. 5 is a front view showing a first embodiment of an operation panel for a printer.

FIG. 5 shows an operation panel of the laser beam printer, in which there are arranged a ten-key 61, test key 62, pause/cancel key 63, message display portion 64, mode selector button switch 65 (copy mode, print mode, fax mode), selected mode indicators 66-1, 66-2, 66-3, indicators 67, 68 for indicating the state of the apparatus whether it is READY or BUSY, and indicators for indicating the troubles of the apparatus, namely, a paper jam indicator 69, trouble indicator 70 for other trouble, paper empty indicator 71, and a toner empty indicator 72.

The image editing unit B will be described hereinafter. For editing the image to be printed, a bit map system is employed.

The bit map system is a system provided with a bit map memory capable of storing thereon the data of image of a one-page quantity and adapted such that the image data are edited on the bit map memory in the form to be printed as they are, and when editing operation for one page has been completed, the data on the memory are output as serial bit data to the laser beam printer to be printed thereby.

The image editing control portion B1 of the image editing unit B is a processor having the function to receive the paper size detected by the paper size detection portions 45, 46 of the printing portion A2 through the printing control portion A1 as the image area data and, according to the image area data, to define the image editing area for one page to be printed on the bit map memory B2, as well as the function to edit image data transmitted from the host system C on the image editing area and to have the same stored thereon and, further, responding to an image data request signal from the printing control portion A1, to read the image data on the bit map memory B2 and to output the same to the printing control portion A1.

The bit map memory B2 is random access memory (RAM) and is controlled by the image editing control portion B1. The bit map memory B2 is the memory for editing and storing of the image data of a one-page quantity to be printed, and on this memory, the image editing area based on the image area data corresponding to the size of the recording paper to be used is established.

In the bit map memory B2 shown in FIG. 1, reference characters l, m indicate the image editing area corresponding to the size of the recording paper established according to the image area data, and l, m correspond to the length of the directions of the main and vertical scanning to be made by the laser beam on the image portion, and the area l×m corresponds to the one page to be printed.

Capacity of the bit map memory B2 is larger in both the main and the vertical scanning directions than the values of the image area data corresponding to the maximum size of the recording paper to be used.

Now, the relationship between the scanning range on the photosensitive drum by the laser beam and the image area will be briefly described.

Figure 6:
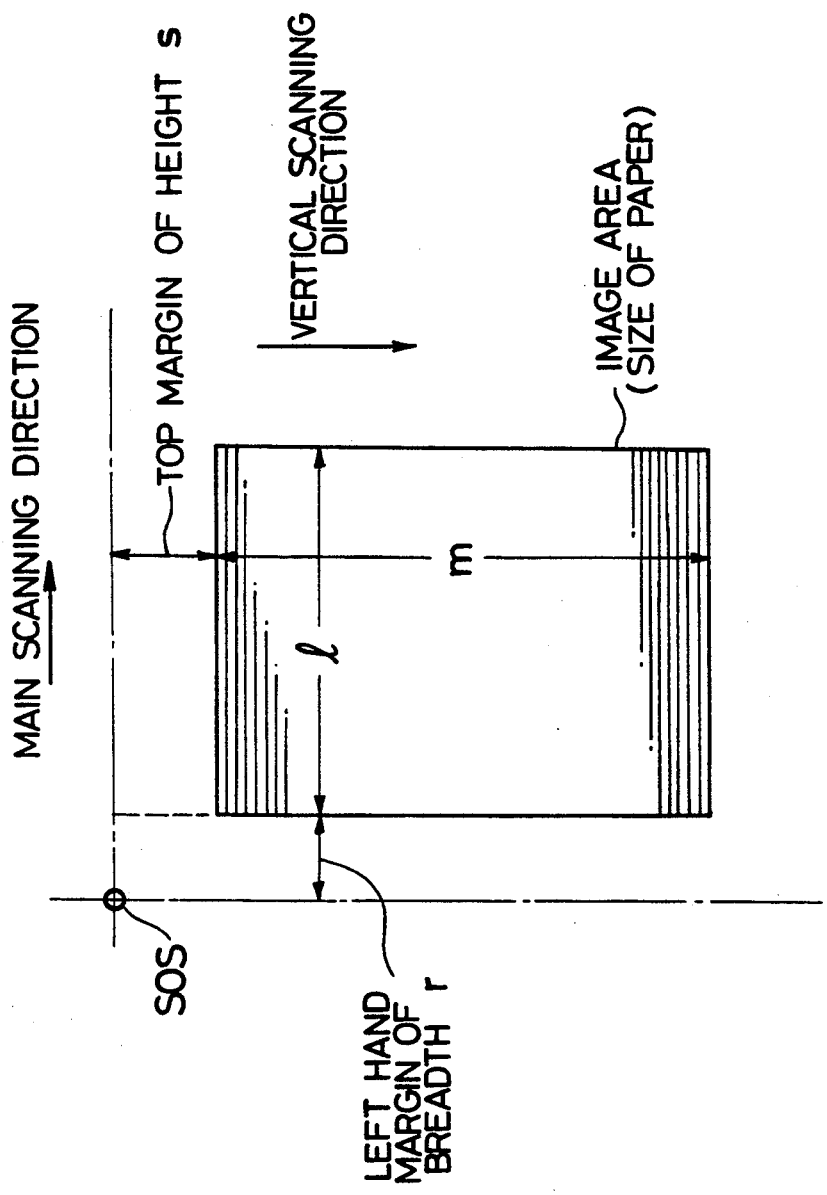
FIG. 6 is a diagram showing relationship between a scanning range by a laser beam and an image area on the photosensitive member.

In FIG. 6, while the image area is indicated by l×m, it is designed such that the laser beam scans the range exceeding the image area, namely, including the left-hand margin of a breadth of r and the top margin of a height of s as shown in the figure. And it is further arranged so that, when the image area data l, m are input to the printing control portion A1, the margins of the breadth r and height s may also be automatically established in the printing control portion A1.

When scanning on the photosensitive member by the laser beam is started, time counting for the beam scanning time in the vertical scanning direction (the longitudinal direction in FIG. 6) is started in the processor of the printing control portion A1, and when the time corresponding to the height s of the top margin has elapsed, it is decided that the image area in the vertical scanning direction is reached. At this time point, the laser beam is detected by a beam sensor SOS located at one end of the scanning area, and upon receipt of the detection signal by the processor, time counting of the beam scanning time in the main scanning direction (the transverse direction in FIG. 6) is started, and when the time corresponding to the breadth r of the left-hand margin has elapsed, it is decided that the printing position in the main scanning direction is also reached.

Scanning of the image portion is started by laser beam modulated by the image data incoming from the bit map memory and the scanning is continued until the completion of counting the time corresponding to the image area data l in the main scanning direction. With the completion of the time counting, one scanning operation in the main scanning direction is completed.

In like manner, the main scanning is repeated, with the times corresponding to r and l counted in succession.

In the meantime, counting of the time corresponding to the image area data m in the vertical scanning direction is also made, and with the completion of the time counting in the vertical scanning direction, latent image formation of the photosensitive member corresponding to the one-page quantity edited on the bit map memory is completed.

Now, operations of the recording apparatus will be described.

The description will first be made as to the case where the recording paper is fed by an automatic paper feed mechanism. In the description, the paper is supplied only from the upper cassette.

When the paper supply cassette 41 (or the universal cassette 50) is set at the paper supply inlet of the printing portion A2 of the printing unit, the printing control portion A1 actuates the paper size detection portion 45 and detects the size of the recording paper from the magnet code portion 47 provided on the underside of the paper supply cassette 41, and outputs the same as the image area data to the image editing control portion B1.

The image editing control portion B1, based on the incoming image area data, establishes the image editing area l×m on the bit map memory B2. And, the same edits the image data input from the host system C on the image editing area and stores the edited data thereon.

Upon receipt of an image data request signal from the printing control portion A1, the image editing control portion B1 reads image data on the bit map memory B2 and outputs the same to the printing control portion A1.

The printing control portion A1 outputs the incoming image data to the printing portion A2, whereby the laser beam is modulated by image data and an electrostatic latent image corresponding to the image data is formed on the photosensitive member, and thereafter, an image is formed on the recording paper through the same developing and fixing means as in ordinary electrophotographic copiers.

The case where the paper is fed manually will now be described.

In the case of the manual feed, the paper is fed to manual feed paper supply tray 40 mounted in the recording apparatus as shown in FIG. 2.

The manual feed tray 40 is provided with the same arrangement as the set of the guide plate in the breadthwise direction and the position detecting mechanism therefor provided in the universal cassette shown in FIG. 4, whereby the breadth signal for the recording paper is provided from the position of the guide plate set to the recording paper by the user when the paper is fed manually. This breadth signal is used for establishing the later discussed image area.

The signal processing for image editing and printing performed in the image editing control portion B1 and the printing control portion A1 will be described below.

Figure 7:
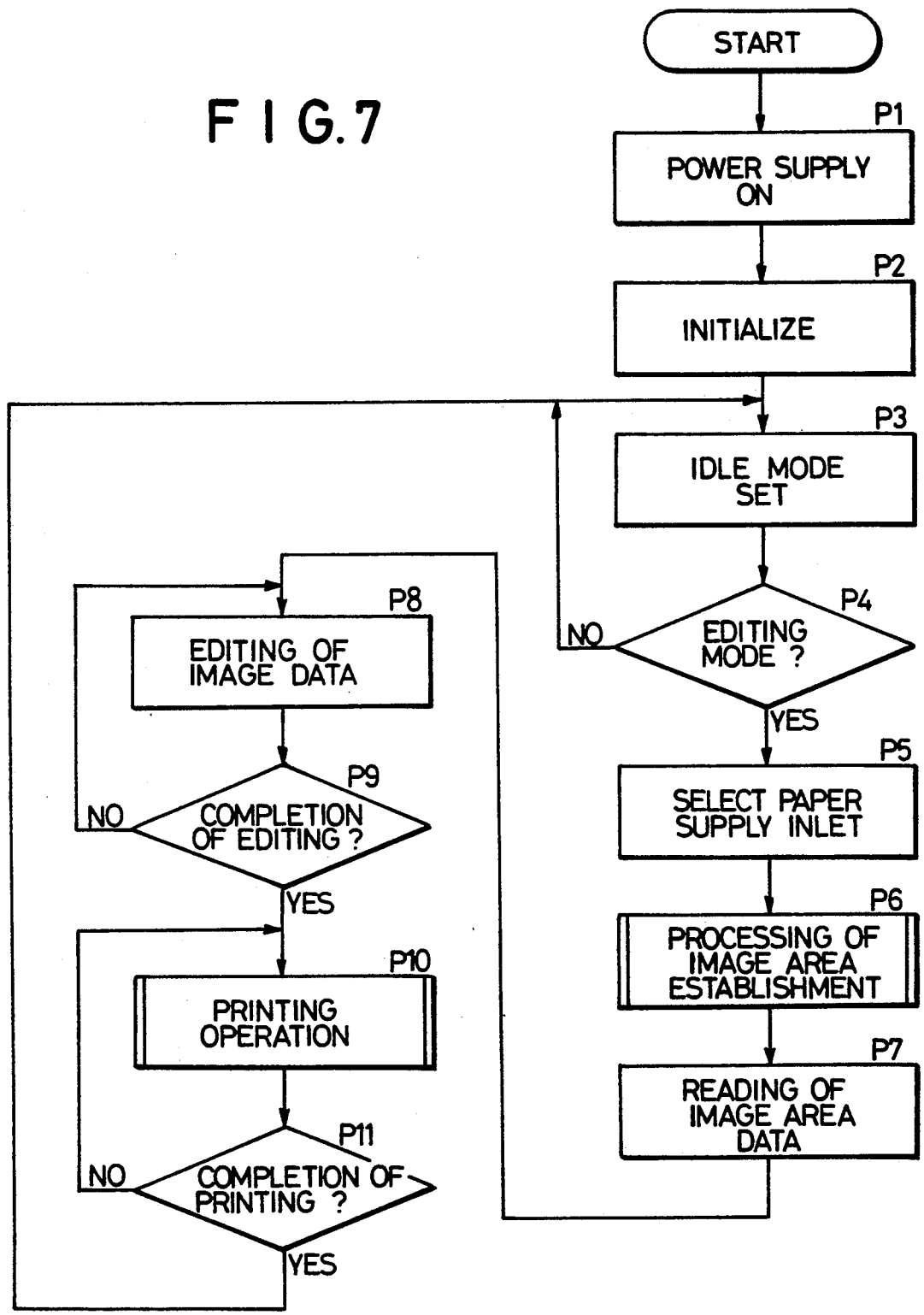
FIG. 7 is a flow chart showing outline of a first embodiment of signal processing for editing and printing of an image data.

FIG. 7 is a flow chart showing outline of a first embodiment of signal processing for editing and printing of an image data. Upon turning on of the power supply, the memory, etc. are initialized (steps P1, P2). After idle mode is set (step P3), it is checked whether editing mode is set or not (step P4). If the editing mode is not set, the sequence returns to the idle mode (step P3), but if the editing mode is set, the specified paper supply inlet, upper one in the description, is selected (step P5) and an image area is established on the bit map memory (step P6). Detailed description of the processing in step P6 will be made later on.

Then, image data output from the host system such as a computer or word processor are read and editing of image data is carried out (steps P7, P8). Upon completion of the editing (step P9), printing operation is started (step P10). Detailed description of the processing in step P10 will be made later. Upon completion of the printing operation (step P11), the sequence returns to the idle mode (step P3) and moves to the next step.

Figure 8A:
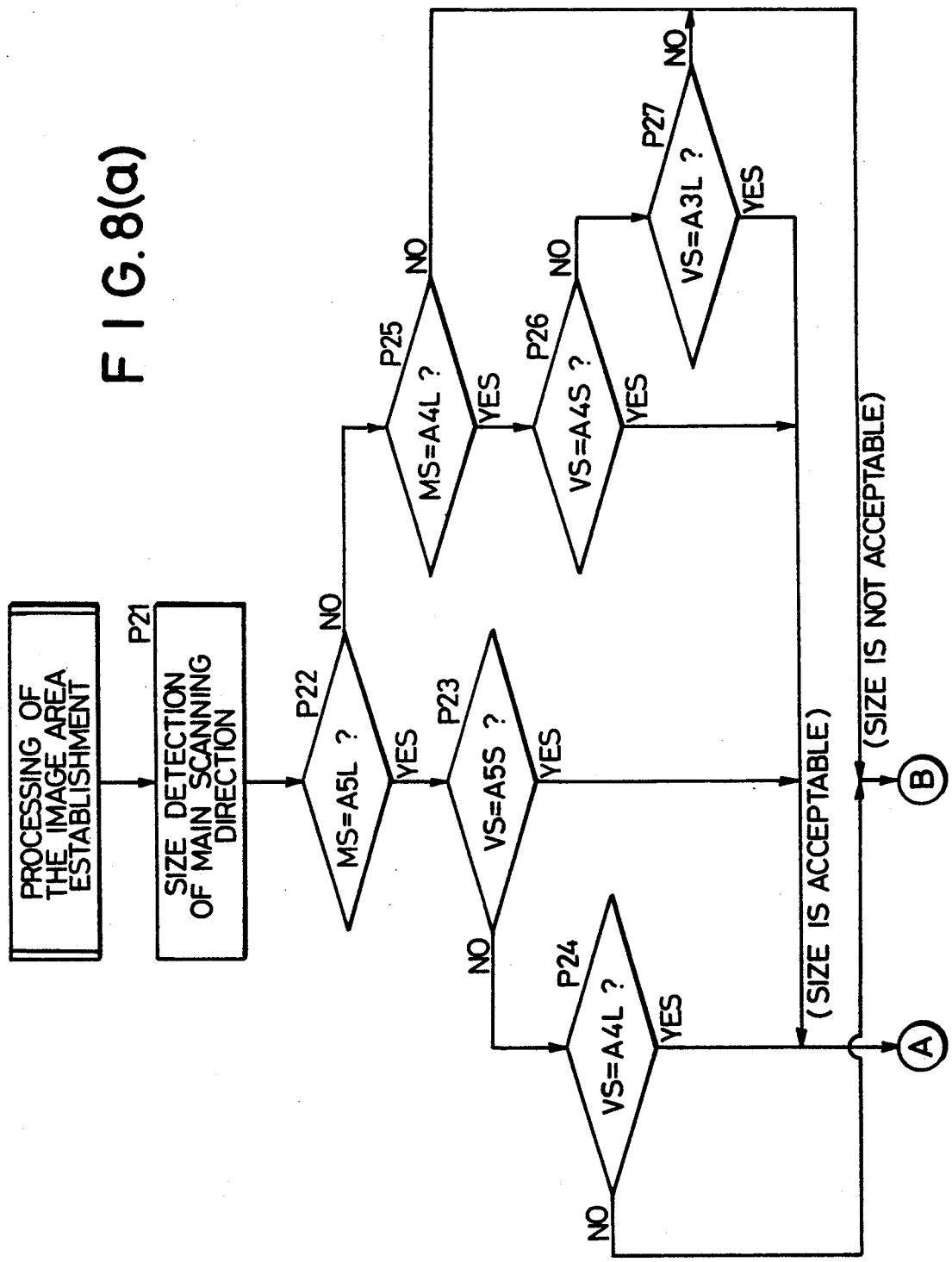

Hereinafter the subroutine indicated by step P6 in the flow chart of FIG. 7 for processing of the establishment of the image area will be described referring to the flow chart shown in FIG. 8. In the present embodiment, the case where recording paper of sizes A5, A4, and A3 are used is described, but it is of course possible to apply the embodiment to other sizes of paper only by changing the parameters for the sizes of the recording paper.

First, the magnet code indicating the size of the recording paper in the paper supply cassette is read, and thereby, the size to be established as the size in the main scanning direction by the printer is detected (step P21).

Decision is made as to whether or not the size in the main scanning direction is equal to the longer side of the paper size A5 (MS=A5L) (step P22), and if it is equal to the longer side of size A5 (MS=A5L), then decision is made whether or not the size in the vertical scanning direction is equal to the shorter side of the paper size A5 (VS=A5S) (step P23). If, as the result, the size is equal to the shorter side of size A5 (VS=A5S), it means that recording paper of size A5 is set, and therefore, the sequence advances to step P34 and establishes the image area for size A5 with its longer side to the main scanning direction.

In step P23, if the size is decided to be unequal to the shorter side of size A5, the sequence advances to step P24, in which decision is made as to whether or not the size in the vertical scanning direction is equal to the longer side of size A4 (VS=A4L). If the size is equal to the longer side of size A4 (VS=A4L), it means that recording paper of size A4 is set, and therefore, the sequence advances to step P34 and establishes the image area for size A4 with its shorter side to the main scanning direction.

If, in step P22, the size is decided to be unequal to the longer side of size A5, the sequence advances to step P25, and therein, decision is made as to whether or not the size in the main scanning direction is equal to the longer side of size A4 (MS=A4L). If, as the result, it is equal to the longer side of size A4 (MS=A4L), then decision is made as to whether or not the size in the vertical scanning direction is equal to the shorter side of size A4 (VS=A4S) (step P26), and if it is equal to the shorter side of size A4 (VS=A4S), it means that recording paper of size A4 is set, and therefore, the sequence advances to step P34 and establishes the image area for size A4 with its longer side to the main scanning direction.

If, in step P26, the size is decided to be unequal to the shorter side of size A4, the sequence advances to step P27, and therein, decision is made as to whether or not the size in the vertical scanning direction is equal to the longer side of size A3 (VS=A3L). If it is equal to the longer side of size A3 (VS=A3L), it means that recording paper of size A3 is set, and therefore, the sequence advances to step P34 and establishes the image area for size A3 with its shorter side to the main scanning direction.

If the size is found unequal to the longer side of size A4 as the result of the decision in step P24, or if the size is found unequal to the longer side of size A3 as the result of the decision in step P27, it is where the signal for size in the vertical scanning direction is not correctly input from the paper supply cassette, such as when the guide in the vertical scanning direction of the universal cassette is not correctly set, for example, and if the size is found unequal to the longer side of size A4 as the result of decision in step P25, it is where the signal for size in the main scanning direction is not correctly input from the paper supply cassette, such as when the guide in the main scanning direction of the universal cassette is not correctly set, for example, and under such condition it is impossible to establish an image area in the printer.

Therefore, when the size in the main scanning direction coincides with a specific paper size, at least, the following steps are taken for establishing an image area with the main scanning direction taken as the longer side of the recording paper. That is, first in step P28, decision is made as to whether the size in the main scanning direction is equal to the longer side of size A5 (MS=A5L), and if it is equal to the longer side of size A5 (MS=A5L), the shorter side of size A5 is selected as the size in the vertical scanning direction (step P30), and the image area is established based on this size (step P34). If, as the result of decision in step P28, the size is found unequal to the longer side of size A5, the sequence advances to step P29, and therein, decision is made as to whether or not the size in the main scanning direction is equal to the longer side of size A4 (MS=A4L), and if it is equal to the longer side of size A4 (MS=A4L), the shorter side of size A4 is selected as the size in the vertical scanning direction (step P31), and the image area is established based on this size (step P34). By taking such steps, there arises no problem even if the size in the vertical scanning has not been input.

If, as the result of the decision in step P29, the size is found unequal to the longer side of size A4 (MS=A4L), it is where the size in the main scanning direction also is not correctly input, and then, a paper empty warning indication is set (step P32) to urge the operator of the printer to set the recording paper again and the printing operation is stopped (step P33).

The paper empty warning indication is given by an LED 71 on the operation panel as shown in FIG. 5.

Now, the routine for processing the printing operation will be described with reference to FIG. 9. Firstly, the operation of the printing portion of an electrophotographic system is started (step P41). Then, the image area data are read (step P42) and the timers to count the scanning times for controlling the image area are set (step P43). This operation will be better understood by referring to the relationship between the scanning range by the laser beam on the photosensitive drum and the image area as described above referring to FIG. 6.

According to the timer for the vertical scanning direction, the margin s in the vertical direction is decremented by 1 at a predetermined interval and when the state of s=0 is reached, it is decided that the printing position in the vertical scanning direction is reached (steps P44, P45).

At this time, the detection of the laser beam by the laser beam sensor SOS is watched on (step P46). If the detection is made, the sequence advances to step P47, and therein, according to the timer for the main scanning direction, the length of the margin r in the main scanning direction is decremented by 1 at a predetermined interval and when the state of r=0 is reached, it is decided that the image position in the main scanning direction is reached (steps P47, P48).

Since, now, the image area is reached in both the main and the vertical scanning directions, the image data are requested (step P49), and thereby, the scanning on the photosensitive member is performed according to the image data.

According to the timer for the main scanning direction, the distance l of the printing area in the main scanning direction is decremented by 1 at the predetermined intervals and in the meantime the image data are successively requested until the state of l=0 is reached (steps P49, P50, P51).

When l has become l=0, it is when one scanning operation in the main scanning direction has been completed, and therefore, the scanning in the vertical scanning direction according to the timer for the vertical scanning direction is followed. While the length m of the printing area in the vertical scanning direction is decremented by 1 at the predetermined intervals, the lengths r and l are set and the scanning in the main scanning direction is performed over and over again until the state of m=0 is reached (steps P52, P53, P55).

When m has become m=0, that is, when the scanning in the vertical direction has been finished, it means that the scanning for printing of the one-page has just been completed, and therefore, the step for finishing operation is taken (step P54) and the subroutine is thus ended.

Figure 10:
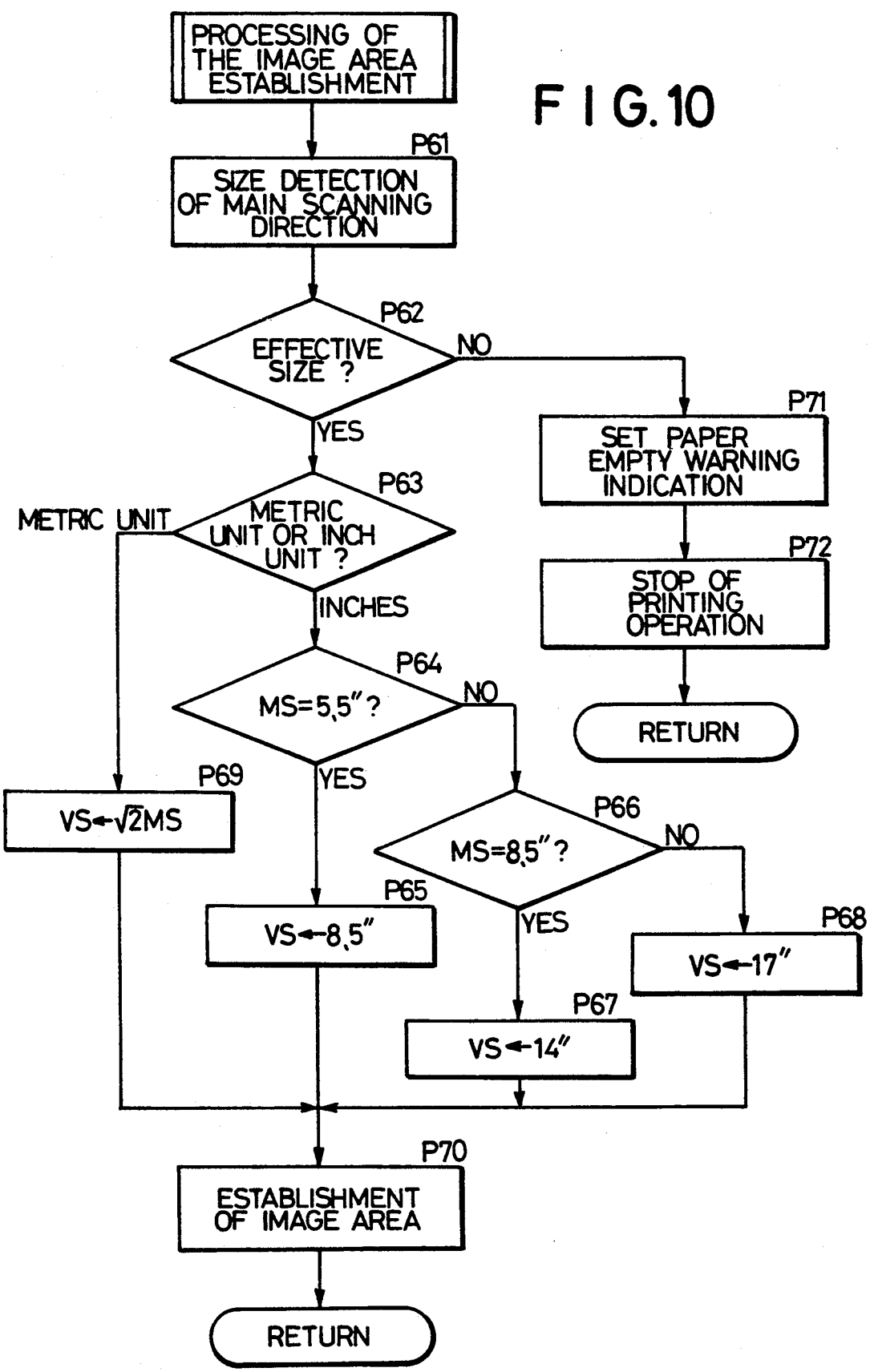
FIG. 10 is a flow chart of another example of the image area establishment routine.

Another example of the routine for the processing of the image area establishment will be described below with reference to FIG. 10. In the present example, once the size in the main scanning direction of the recording paper has been detected, the size in the vertical scanning direction is automatically selected in accordance with the paper size of the main scanning direction and therefore, the process is advanced without detecting any size in the vertical scanning direction from the paper supply cassette.

First, in step P61, the magnet code indicating the size of the recording paper in the paper supply cassette is read, whereby the size to be established as the size in the main scanning direction of the printer is detected. Then, decision is made as to whether or not the detected size in the main scanning direction corresponds to any of the available recording paper sizes that are memorized in the CPU, that is, whether or not the same is an effective size (step P62). If it is effective, it is checked whether the size to be established is in metric unit or it is in inch unit (step P63). If it is found to be established in inch unit, the sequence advances to step P64 and therein the size in the main scanning direction is checked (step P64). That is, it is checked, in the present example, whether the size is 5.5" (MS=5.5"?) or not, for example, and if the size is 5.5" (MS=5.5"), then 8.5" is selected as the size in the vertical scanning direction (VS←8.5") (step P65) and the image area is established with this dimension (step P70).

As the result of the checking as to the size in the main scanning direction in step P64, if it is not 5.5" (MS≠5.5"), then the sequence moves to step P66, and therein, decision is made as to whether or not the size in the main scanning direction is 8.5" (MS=8.5"?), and if it is 8.5" (MS=8.5"), then 14" is selected as the size in the vertical scanning direction (VS←14") (step P67), and the image area is established with this dimension (step P70).

As the result of the checking of the size in the main scanning direction in step P66, if it is not 8.5" (MS≠8.5"), it is where the largest size of recording paper is set, and 17" is selected as the size in the vertical scanning direction (VS←17") (step P68), and the image area is established with this size (step P70).

As the result of the decision made in step P63, if the size to be set is in metric unit, the sequence moves to step P69, and therein, the product of square root of 2 and the size in the main scanning direction is calculated as the size in the vertical scanning direction (VS←$\sqrt{2}$ MS), and the image area is established with this size (step P70).

If, as the result of the decision made in step P62, the size in the main scanning direction is found ineffective, it means that recording paper of applicable size is not set, and so, the paper empty warning indication is set to urge the operator of the printer to set the recording paper again (step P71) and the printing operation is stopped (step P72).

FIGS. 11 to 14 show a second embodiment of the present invention. The second embodiment is characterized of two kinds of establishing modes, that is, the mode for establishing the image area by deciding the paper size from both the detected breadth and length of the recording paper as described in the first embodiment and the mode for establishing the image area by deciding the paper size from only the detected breadth of the recording paper, and either mode is enabled to be selected by the operator. In the description made hereinafter, the former establishing mode will be called the NORMAL mode and the latter establishing mode will be called the SPECIAL mode.

Figure 11:
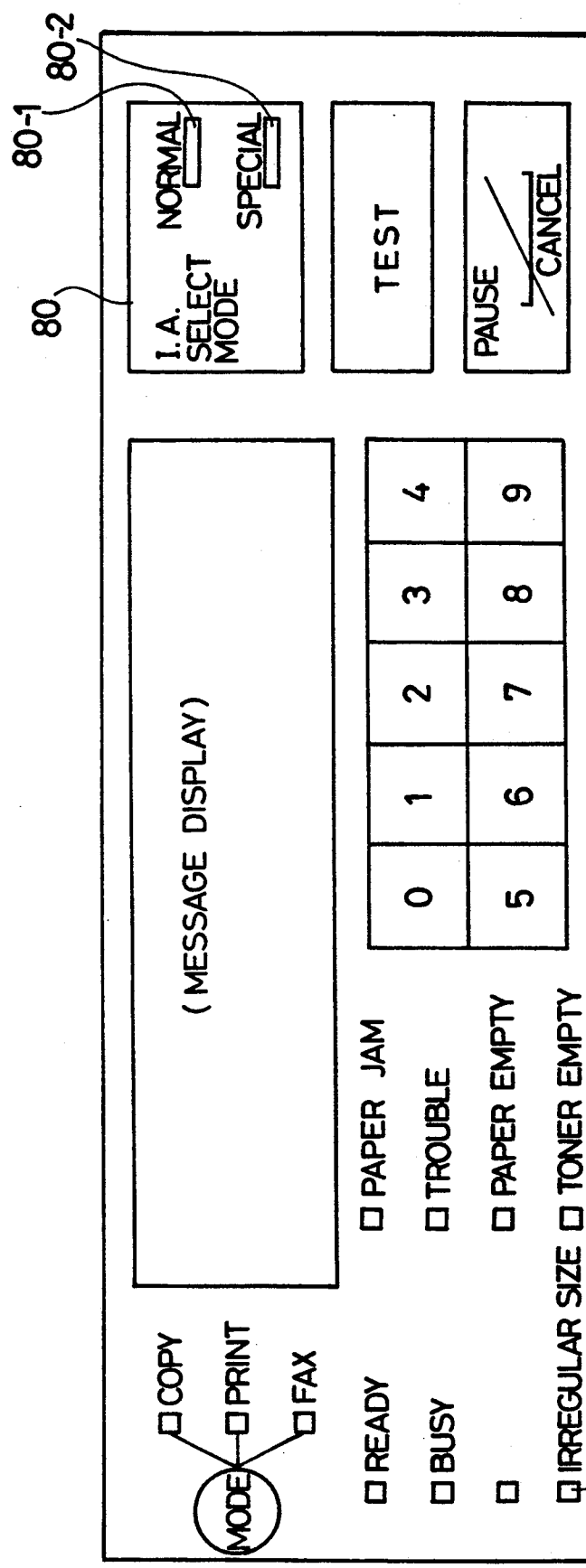
FIG. 11 is a front view showing a second embodiment of the operation panel for a printer.

FIG. 11 shows the operation panel for the laser beam printer which is different from the panel for the first embodiment shown in FIG. 5 in the following points. First, an image area establishing mode selector key 80 is provided at the top right-hand corner of the operation panel, which is adapted such that every time the selector key 80 is depressed, the NORMAL mode and the SPECIAL mode are alternately selected and either of the NORMAL mode indicator 80-1 and the SPECIAL mode indicator 80-2 is accordingly lighted to indicate the selected image area establishing mode. Secondly, at the bottom left-hand corner of the operation panel, there is provided an indicator 83 indicating when paper size is not of a regular size.

Hereinafter, signal processing for image editing and printing, specifically for selection of the image area establishing mode by operation of the establishing key 80, and the processing for the establishment of the image area will be described.

Figure 12:
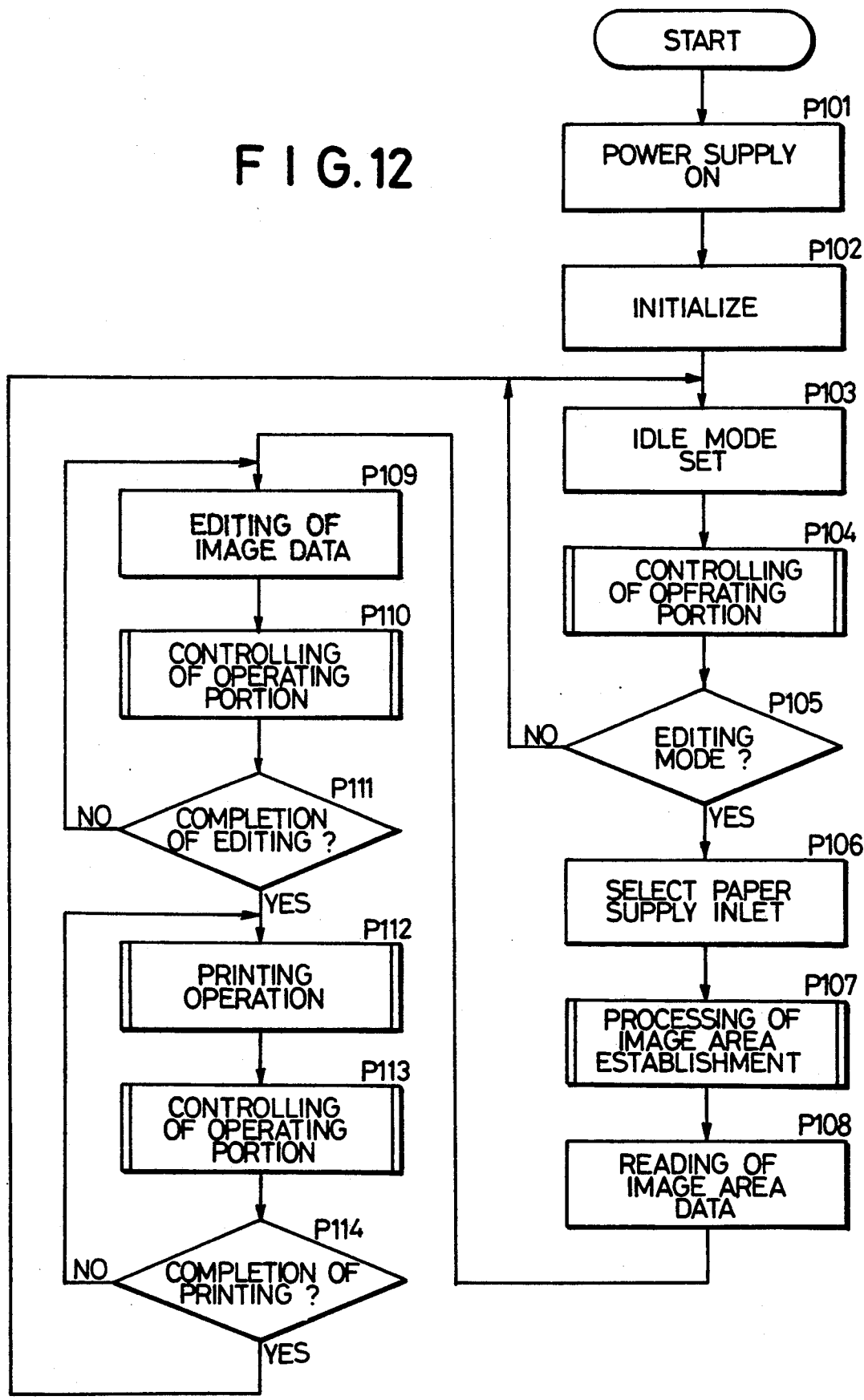
FIG. 12 is a flow chart showing outline of a second embodiment of signal processing for edition and printing of an image data.

FIG. 12 is a flow chart showing outline of the overall process, which differs from the flow chart as shown in FIG. 7 for the first embodiment in that there is incorporated a later discussed subroutine for controlling the operating portion between steps P3 and P4, between steps P8 and P9, and between steps P10 and P11 in the flow chart for the first embodiment, which are indicated by P104, P110, and P113 in the flow chart of FIG. 12. The other steps, i.e., P101-P103, P105-P109, P111-P112, and P114 correspond to the steps P1-P3, P4-P8, P9-P10, and P11 in the flow chart of FIG. 7, respectively, and therefore, description of the same are omitted.

Figure 13:
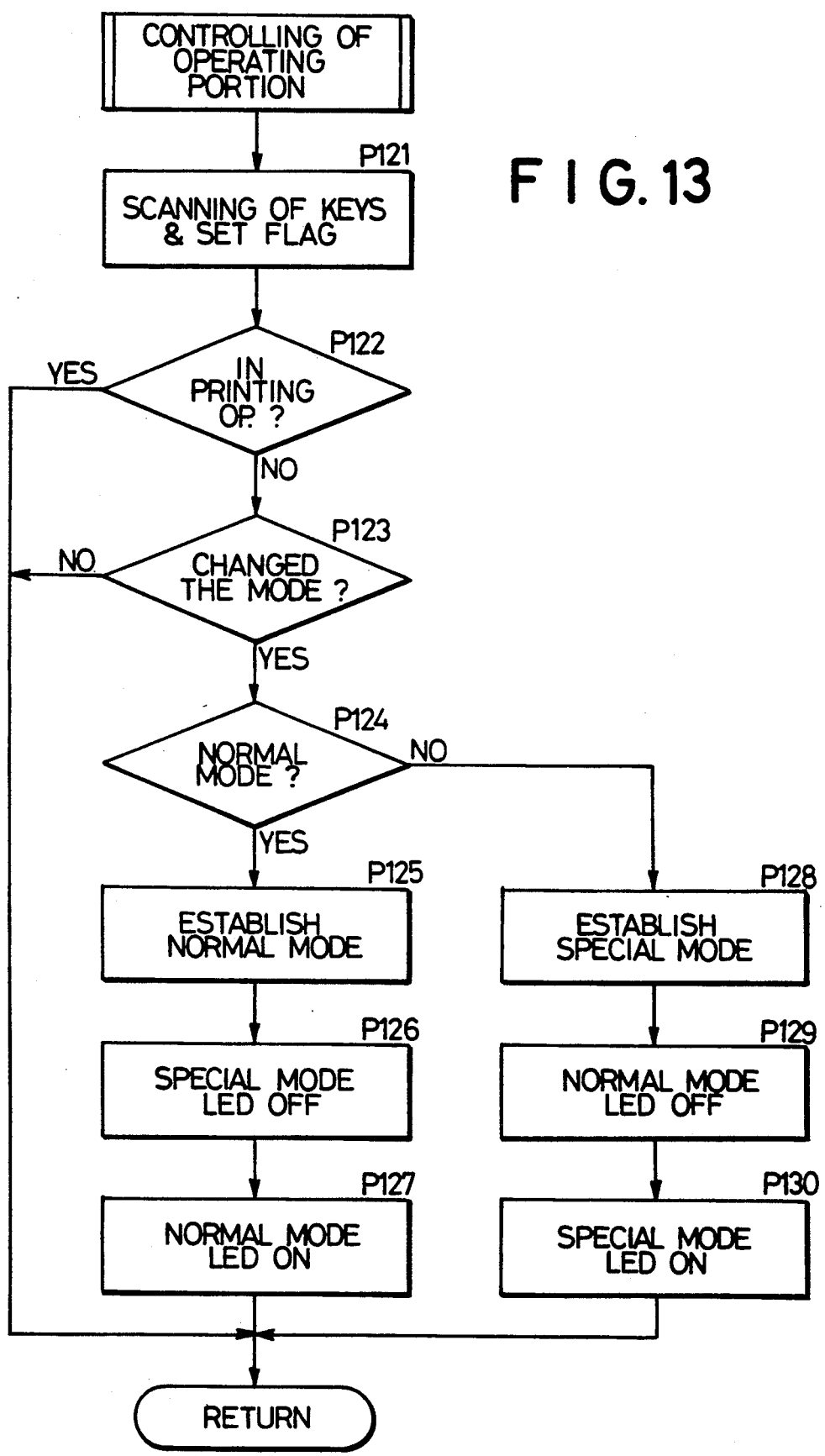
FIG. 13 is a flow chart of an operating portion controlling routine.

FIG. 13 is a flow chart showing the above mentioned subroutine for controlling the operating portion.

First, a key scan is made to check the state of the depressed keys on the operation panel and the state of each key is read (step P121). Flag setting is made corresponding to the state of each key. When the image area establishing mode selector key 80, as the key in connection with the present invention, is operated, and the NORMAL mode is thereby established, the flag F is set to 0, and when the SPECIAL mode is established, the flag is set to 1.

Then, in step P122, it is checked whether the apparatus is currently in the course of printing. If it is in the printing course, the subroutine returns to the main routine, but if it is not in the printing course, the sequence advances to step P123, and therein, it is checked whether or not the image area establishing mode has been changed, namely, whether or not the content of the flag F has been changed by operation of the mode selector key 80. If the mode has not been changed, the subroutine returns to the main routine, but if the mode has been changed, it is decided whether the NORMAL mode is selected or the SPECIAL mode is selected according to the flag F (step P124). If the NORMAL mode is selected, then the NORMAL mode is established, the LED indicating the SPECIAL mode is turned off, the LED indicating the SPECIAL mode is turned off, the LED indicating the NORMAL mode is turned on (steps P125, P126, P127), and the subroutine returns to the main routine. If, as the result of the decision in step P124, the SPECIAL mode is selected, then the SPECIAL mode is established, the LED indicating the NORMAL mode is turned off, the LED indicating the SPECIAL mode is turned on (steps P128, P129, P130), and the subroutine returns to the main routine.

Figure 14A:
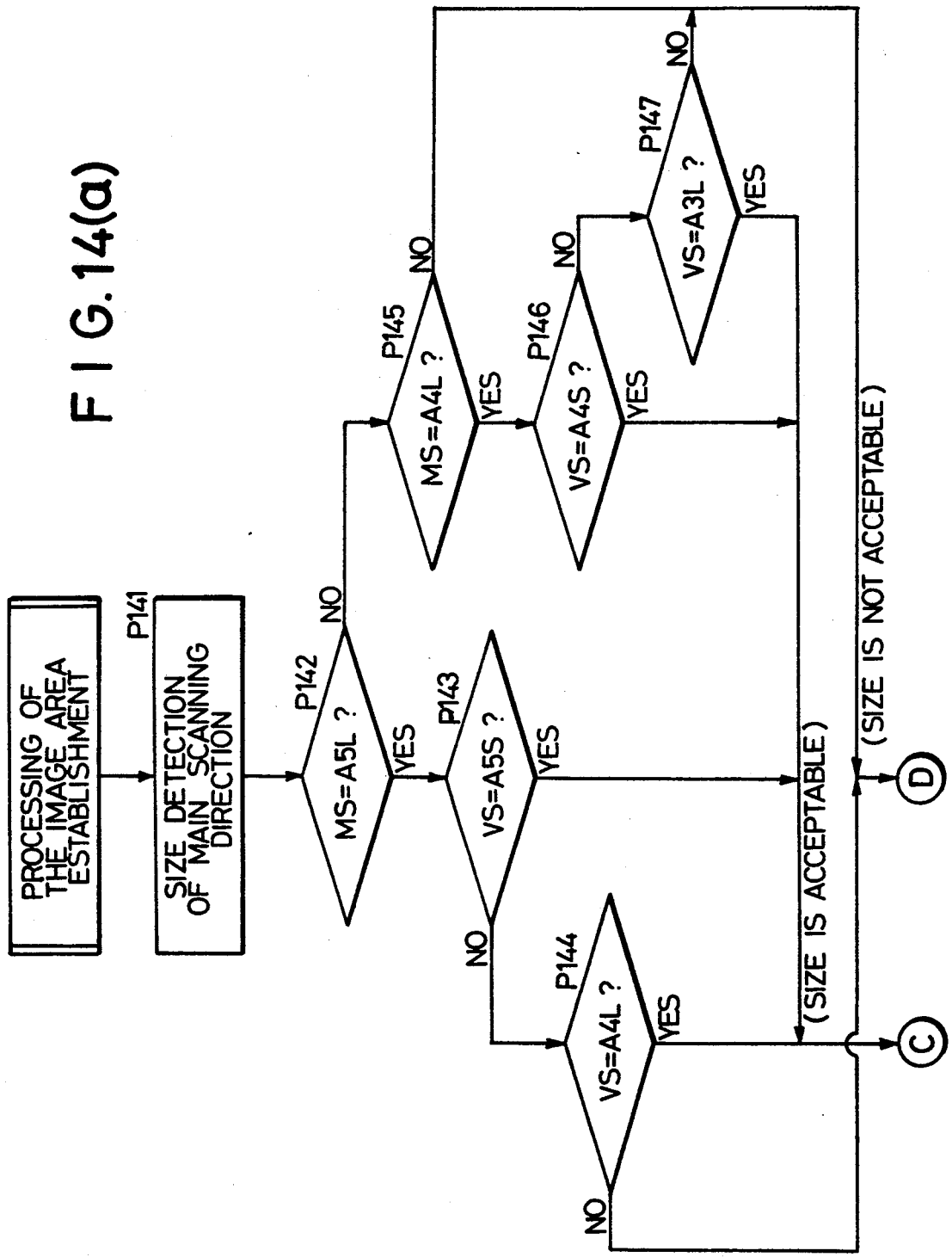

FIG. 14 shows a flow chart of the subroutine for processing the image area establishment as indicated by step P107 in the flow chart of FIG. 12. It differs from the subroutine for processing the image area establishment in the first embodiment as shown in FIG. 8 in that, while the sequence advances to step P28 when the size has been decided to be inapplicable in steps P24, P25 and P27 in the flow chart of FIG. 8, the step P148 for indicating the irregular size indication and the step P149 for decision as to whether the above described image area establishing mode is the SPECIAL mode or not are added in this subroutine. That is, in step P148, the irregular size indication is made for indicating that determination of the size is impossible from the size of the recording paper in the main scanning direction and in the vertical scanning direction. And, then, in step P149, decision is made as to whether or not the mode is the SPECIAL mode, and if it is the SPECIAL mode, the steps in step P150 and following that are taken, that is, the size in the vertical scanning direction is decided based on the size of the recording paper in the main scanning direction and thereby the image area is established. And, if it is decided not to be the SPECIAL mode in step P149, the steps in step P154 and following that are taken, that is, the paper empty warning indication for indicating that there is no recording paper of the applicable size is set and the printing operation is stopped. Since the other steps P141-P147 and steps P150-P156 correspond to steps P21-P27 and steps P28-P34 in the flow chart shown in FIG. 8, description thereof is omitted.

In the above described second embodiment, it is enabled to switch between the NORMAL mode, in which the image area is established according to the size of the recording paper in the main scanning direction and the vertical scanning direction, i.e., the breadth and length, and the SPECIAL mode, in which the image area is established only from the breadth of the recording paper. Therefore, such a manner of usage of the embodiment is possible that the NORMAL mode is used when a print is required to be made in recording paper as desired by the operator, for example, a formal document, and the SPECIAL mode is used when just a print is wanted irrespective of the paper size or when the paper is fed by manual feed.

Throughout the first and second embodiments, the image area is decided by referring to a data set (sizes of the main scanning direction and of the vertical scanning direction) stored on the memory in the printing control portion. Incidentally, the data set includes sets of data indicating predetermined sizes of image areas corresponding to breadthwise sizes of the recording paper.

Incidentally, the dimensions for establishing the size in the main scanning direction and the vertical scanning direction mentioned in the above described embodiments are used just for illustration and it is apparent that they can be freely established according to the sizes of the recording paper to be used. And, the decision step as to whether the size should be established in metric unit or in inch unit may be provided according to the need.

According to the present invention as described so far, in establishing the image area for editing the data to be printed, since the recording medium is standardized and its longitudinal and transverse sizes are determined, the size in the vertical scanning direction is obtainable from a table stored in the memory of the CPU or by calculation, by inputting only the signal for the size in the main scanning direction of the recording medium, and if there are then expected to be present plurality sizes of the recording medium, the image area is possible to be established by adopting the smallest size out of them. Therefore, even in the case where the signal for the size in the vertical scanning direction is not correctly input from the paper supply cassette, or error or omission of the size signal is caused from neglect of setting the guide in the vertical scanning direction as is often the case with the universal cassette, the image area can be correctly set and the apparatus never becomes unable of printing.

And, since the image area established at that time is such as to correspond to the recording medium of the smallest size of those contemplated, there is not produced any loss of data in the print made on the recording medium.

Further, since it is possible to arrange the means for detecting the size of the recording medium installed on the recording medium supply means to be such as is capable of the detection only in the main scanning direction, the number of the component parts can be reduced.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A recording apparatus for recording a visible image on a recording medium based on digital image data comprising:
   editing means, including a memory means, for editing the digital image data and storing the edited digital image data in an image editing area of a predetermined size in said memory means;
   image forming means for forming an image in accordance with the edited digital image data, said image forming means including means for emitting a light beam and means for modulating the light beam in accordance with the edited digital image data;
   supply means for supplying the recording medium to the image forming means;
   detecting means for detecting breadth of the recording medium to output a breadth signal; and
   determination means in response to said breadth signal for determining the size of the image editing area independent of the length of the recording medium, said determination means determining the size of the image editing area before the editing means edits and stores the digital data in the image editing area.

2. A recording apparatus as claimed in claim 1, wherein said supply means includes a member for regulating position of the recording medium in its breadthwise direction and said detection means detects the position of said position regulating member.

3. A recording apparatus as claimed in claim 1, wherein said determination means stops the operation of the image forming means when there is no breadth signal from the said detection means.

4. A recording apparatus as claimed in claim 3, wherein said determination means gives an alarm indication while stopping the operation of the image forming means.

5. A recording apparatus as claimed in claim 4, wherein said alarm indication is provided by lighting of an indicator indicating the empty of the recording medium within the supply means.

6. A recording apparatus as claimed in claim 1, further comprising:
   accommodating means for accommodating a plurality of recording medium therein, said supply means supplying a recording medium from said accommodating means to said image forming means.

7. A recording apparatus as claimed in claim 6, wherein said detecting means is provided at said accommodating means.

8. A recording apparatus for making a record by scanning a light beam modulated in accordance with digital image data comprising:

editing means, including a memory means, for editing the digital image data and storing the edited digital image data in an image editing area of a predetermined size in said memory means;

image forming means for forming an image in accordance with the edited digital image data, said image forming means including means for emitting a light beam and means for modulating the light beam in accordance with the edited digital image data;

receiving means for receiving a recording medium to be supplied to the image forming means, said receiving means including movable regulating members for regulating the received position of the recording medium in a breadthwise direction of the receiving means and in a lengthwise direction of the receiving means, independently;

breadth detection means for detecting the position of the position regulating member in the breadthwise direction to output a breadth signal;

length detection means for detecting the position of the position regulating member in the lengthwise direction to output a length signal;

determining means in response to signal from both the breadth detection means and the length detection means for determining size of the image editing area, said determination means determining the size of the image editing area before the editing means edits and stores the digital data in the image editing area;

alternative determination means in response only to the signal from the breadth detection means for determining size of the image editing area when the position regulating member in the lengthwise direction locates out of predetermined positions; and control means in response to a signal from the determination means and the alternative determination means for changing the size of the image editing area.

9. A recording apparatus as claimed in claim 8, wherein said control means controls the image forming means so that a operation of the image forming means is stopped when there is no signal from the determination means or alternative determination means.

10. A recording apparatus as claimed in claim 9, wherein said control means gives an alarm indication while stopping the operation of the image forming means.

11. A recording apparatus as claimed in claim 10, wherein said alarm indication is provided by lighting of an indicator indicating the empty of the recording medium within the supply means.

12. A recording apparatus for recording a visible image on a recording medium based on digital image data comprising:

editing means, including a memory means, for editing the digital image data and storing the edited digital image data in an image editing area of a predetermined size in said memory means;

image forming means for forming the visible image on the recording medium in accordance with the edited digital image data;

supply means for supplying the recording medium to the image forming means;

detection means for detecting the breadth of the recording medium in order to output a breadth signal, and determining means in response to said breadth signal for determining the size of the image editing area independent of the length of the recording medium, said determination means determining the size of the image editing area before the editing means edits and stores the digital data in the image editing area.

13. A recording apparatus as claimed in claim 12, further comprising:

accommodating means for accommodating a plurality of recording medium therein, said supply means supplying a recording medium from said accommodating means to said image forming means.

14. A recording apparatus as claimed in claim 13, wherein said detecting means is provided at said accommodating means.

15. A recording apparatus for making a record in accordance with digital image data comprising:

editing means including a memory means, for editing the digital image data and storing the edited digital image data in an image area of a predetermined size in said memory means;

image forming means for forming an image on a recording medium in accordance with the edited digital data;

receiving means for receiving a recording medium to be supplied to the image forming means, said receiving means including movable regulating members for regulating the received position of the recording medium in its breadthwise direction and in its lengthwise direction, independently;

breadth detection means for detecting the position of the position regulating member in the breadthwise direction to output a breadth signal;

length detection means for detecting the position of the position regulating member in the lengthwise direction to output a length signal;

determination means in response to signal from both the breadth detection means and the length detection means for determining size of the image editing area;

alternative determination means in response only to the signal from the breadth detection means for determining size of the image editing area when the position regulating member in the lengthwise direction locates out of predetermined positions, said determination means and said alternative determination means determining the size of the image editing area before the editing means edits and stores the digital data in the image editing area, and control means in response to a signal from the determining means and the alternative determination means for changing the size of the image editing area.

16. A recording apparatus comprising:

image forming means for forming an image on a recording medium;

means for supplying the recording medium to the image forming means;

breadth detection means for detecting the breadth of the recording medium to output a breadth signal;

length detection means for detecting the length of the recording medium to output a length signal;

determination means in response to signals from both the breadth direction means and the length detection means for determining the size of an image area;

indicating means for indicating when no length signal is output by the length detection means;

alternative determination means, which operates in response only to the signal from the breadth detection means, for determining the size of the image area when no length signal is output by the length detection means; and means for controlling the image forming means in accordance with the image area size determined by said determination means when both the breadth signal and the length signal are output, and for controlling the image forming means in accordance with the image area size determined by said alternative determination means when no length signal is output.

17. A recording apparatus comprising:

image forming means for forming an image on a recording medium;

first detecting means for detecting the length of the recording medium in a first direction and generating a first signal;

second detecting means for detecting the length of the recording medium in a second direction perpendicular to the first direction and generating a second signal;

determination means for determining the size of the recording medium in response to the first signal and the second signal;

informing means for informing an operator that the determination of the size is impossible when at least one of the first and second signals is not generated;

alternative determination means for determining the size of the recording medium in response to one of said signals when another signal is not generated; and control means for controlling the image forming means in accordance with the determined size by said determination means when both the first and second signals are generated, and for controlling the image forming means in accordance with the size determined by said alternative determination means when one of said signals is not generated.

18. A recording apparatus comprising:

image forming means for forming an image on a recording medium;

means for supplying the recording medium to the image forming means;

breadth detection means for detecting the breadth of the recording medium to output a breadth signal;

length detection means for detecting the length of the recording medium to output a length signal;

determination means in response to signals from both the breadth direction means and the length detection means for determining the size of an image area;

operable means for generating selection output;

setting means for selectively setting said apparatus in a special mode or a normal mode in accordance with the selection output of said operation means;

alternative determination means in response only to the signal from the breadth detection means for determining the size of the image area when no length signal is output by the length detection means in said special mode; and control means for controlling the image forming means in accordance with the determined image area size, said control means inhibiting said image forming means from forming an image when no length signal is output by the length detection means when said recording apparatus is set in said normal mode.

19. A recording apparatus as claimed in claim 18, a second control means for inhibiting said image forming means from forming an image when no breadth signal is output by the breadth detection means whether said recording apparatus is set in the special mode or set in the normal mode.

20. A recording apparatus comprising:

image forming means for forming an image on a recording medium;

first detecting means for detecting the length of the recording medium in a first direction and generating a first signal;

second detecting means for detecting the length of the recording medium in a second direction perpendicular to the first direction and generating a second signal;

determination means for determining the size of the recording medium in response to the first signal and the second signal;

alternative determination means for determining the size of the recording medium in response to said first signal when said second signal is not generated;

selecting means for selecting one of a first and a second operation mode; and control means for controlling the image forming means to perform an image forming operation in accordance with the size determined by said determination means when said first and second signals are both generated, for controlling said image forming means to perform the image forming operation in accordance with the size determined by said alternative determination means said second signal is not generated if said first operation mode is selected, and for prohibiting said image forming means from performing the image forming operation if said second operation mode is selected.

21. A recording apparatus as claimed in claim 20, wherein said control means inhibits said selecting means from changing a selected operation mode during an image forming operation by said image forming means.

22. A recording apparatus as claimed in claim 20, further comprising informing means for informing that the determination of the size is impossible when at least one of the first and second signals are not generated.

23. A recording apparatus comprising:

image forming means for forming an image on a recording medium;

first detecting means for detecting the length of the recording medium in a first direction and generating a first signal;

second detecting means for detecting the length of the recording medium in a second direction perpendicular to the first direction and generating a second signal;

determination means for determining the size of the recording means in response to the first signal and the second signal;

alternative determination means for determining the size of the recording medium in response to the first signal when the second signal is not generated; and control means for controlling the image forming means in accordance with the determined size, said control means inhibiting said image forming means from performing an image forming operation regardless of the generation of the second signal when the first signal is not generated.

24. A recording apparatus comprising:

image forming means for forming an image on a recording medium;

means for supplying the recording medium to the image forming means;

breadth detection means for detecting the breadth of the recording medium and outputting a breadth signal;

length detection means for detecting the length of the recording medium to output a length signal;

determination means, in response to both the breadth signal and the length signal, for determining the size of an image area when the length signal is compatible with the breadth signal;

alternative determination means, in response only to the breadth signal, for determining the size of an image area when the length signal is not compatible with the breadth signal; and means for controlling the image forming means in accordance with the determined image area size.

25. The recording apparatus of claim 24 wherein said alternative determination means determines a smallest size of all possible size of image areas.

26. A recording apparatus comprising:

image forming means for forming an image on a recording medium;

first detecting means for detecting a first dimension of the recording medium in a first direction;

second detecting means for detecting a second dimension of the recording medium in a second direction perpendicular to the first direction;

determination means for determining the size of the recording means from the first and second dimensions when the first and second dimensions correspond to a predetermined combination;

alternative determination means for determining the size of the recording medium from only one of the first and second dimensions when the first and second dimensions do not correspond to the predetermined combinations; and control means for controlling the image forming means in accordance with the determined size.

27. The recording apparatus of claim 26 wherein said alternative determination means determines a smallest size of all possible sizes of image areas.

* * * * *